United States Patent
Burton et al.

(10) Patent No.: US 10,982,805 B2
(45) Date of Patent: Apr. 20, 2021

(54) ERGONOMIC DEVICE FOR SUSPENDING AIRCRAFT FLIGHT CONTROL APPARATUSES

(71) Applicant: Lockheed Martin Corporation, Bethesda, MD (US)

(72) Inventors: David W. Burton, Greenville, SC (US); Donald J. Ausmus, Greenville, SC (US)

(73) Assignee: Lockheed Martin Corporation, Bethesda, MD (US)

( * ) Notice: Subject to any disclaimer, the term of this patent is extended or adjusted under 35 U.S.C. 154(b) by 409 days.

(21) Appl. No.: 15/078,758

(22) Filed: Mar. 23, 2016

(65) Prior Publication Data

US 2016/0280398 A1    Sep. 29, 2016

Related U.S. Application Data

(60) Provisional application No. 62/137,127, filed on Mar. 23, 2015.

(51) Int. Cl.
*F16M 11/24* (2006.01)
*B64F 5/10* (2017.01)

(52) U.S. Cl.
CPC ............ *F16M 11/24* (2013.01); *B64F 5/10* (2017.01)

(58) Field of Classification Search
CPC .. B64F 5/0009; B64F 5/10; B64F 5/40; B64F 5/50; F16M 11/10; F16M 11/18; F16M 11/24; B25H 1/00; B25B 1/2484; B25B 5/102; B25B 5/085

USPC ............................ 269/266, 171, 166, 55, 17
See application file for complete search history.

(56) References Cited

U.S. PATENT DOCUMENTS

| | | | | |
|---|---|---|---|---|
| 3,327,986 A | * | 6/1967 | Oury | E04G 17/07 249/45 |
| 6,485,247 B1 | * | 11/2002 | Groves | B66F 7/20 180/125 |
| 6,533,260 B1 | * | 3/2003 | Mock | A61G 7/08 254/133 R |
| 6,615,478 B2 | * | 9/2003 | Walker | B62D 65/02 29/281.4 |
| 7,175,168 B2 | | 2/2007 | Hardaker et al. | |
| 7,624,488 B2 | * | 12/2009 | Lum | B25B 5/14 269/287 |
| 7,941,905 B2 | | 5/2011 | Garland et al. | |
| 8,528,887 B2 | * | 9/2013 | Humfeldt | B64D 11/003 269/291 |
| 8,534,650 B2 | * | 9/2013 | Humfeldt | B64F 5/10 269/17 |
| 8,562,302 B2 | | 10/2013 | Bakhuis et al. | |
| 8,850,682 B2 | | 10/2014 | Garland et al. | |
| 2011/0147328 A1 | * | 6/2011 | Vogel | B64F 5/50 212/175 |

FOREIGN PATENT DOCUMENTS

DE        10216258 A1 *   4/2003   ............ F16M 11/42

* cited by examiner

*Primary Examiner* — Tyrone V Hall, Jr.
*Assistant Examiner* — Abbie E Quann
(74) *Attorney, Agent, or Firm* — Baker Botts L.L.P.

(57) ABSTRACT

In one embodiment, a device includes a spine, a first support coupled to a first end of the spine, a second support coupled to a second end of the spine, and a plurality of fixtures coupled to the spine. The plurality of fixtures are configured to couple an aircraft flight control apparatus to the spine.

15 Claims, 4 Drawing Sheets

ERGONOMIC DEVICE FOR SUSPENDING AIRCRAFT FLIGHT CONTROL APPARATUSES

RELATED APPLICATION

This application claims the benefit under 35 U.S.C. § 119(e) of U.S. Provisional Application Ser. No. 62/137,127 filed Mar. 23, 2015 entitled "Flight Control Rotational Ergonomic Device."

TECHNICAL FIELD

This disclosure generally relates to tools and more specifically to a device for suspending and manipulating an aircraft flight control apparatus during maintenance and/or repair.

BACKGROUND

Traditional maintenance and repair processes for aircraft flight control apparatuses, such as wing flaps or ailerons, may require manual lifting, rotation, and carrying of the apparatus. Such physical handling and manipulation may pose a high injury risk to personnel. In addition, these traditional processes may cause potential damage to the apparatus.

SUMMARY OF PARTICULAR EMBODIMENTS

In one embodiment, a device includes a spine, a first support coupled to a first end of the spine, a second support coupled to a second end of the spine, and a plurality of fixtures coupled to the spine. The plurality of fixtures are configured to couple an aircraft flight control apparatus to the spine.

The present disclosure may provide numerous technical advantages. For example, certain embodiments may provide a tool for use in the maintenance and/or repair of aircraft parts (e.g., flight control apparatuses) that reduces downtimes related to such maintenance or repair. This may increase the overall efficiency of the personnel maintaining or repairing the parts, and provide additional safety to such personnel. As another example, certain embodiments may provide a tool that prevents damage to the aircraft part being maintained or repaired.

Other technical advantages will be readily apparent to one skilled in the art from the following figures, descriptions, and claims. Moreover, while specific advantages have been enumerated above, various embodiments may include all, some, or none of the enumerated advantages.

DESCRIPTION OF EXAMPLE EMBODIMENTS

Traditional maintenance and repair processes for aircraft flight control apparatuses, such as wing flaps or ailerons, may require manual lifting, rotation, and carrying of the apparatuses. Such physical handling and manipulation may pose a high injury risk to personnel. For example, shoulder, back, and arm stress/strain may be caused due to the heavy lifting, excessive bending, and/or kneeling required to move or work on the apparatus. In addition, these traditional processes may cause potential damage to the apparatus. For instance, the aircraft flight control apparatus may be suspended loosely between two sawhorse devices, which may increase the chances of damage to the apparatus.

Accordingly, embodiments of the present disclosure provide a tool for suspending and manipulating aircraft parts (e.g., flight control apparatuses, such as wing flaps or ailerons) during maintenance and repair without requiring as much physical lifting, rotation and/or carrying of the apparatus by maintenance personnel. In addition, embodiments of the present disclosure provide a tool for suspending aircraft parts such that maintenance personnel have access to all portions of the apparatus without requiring undue effort on the part of the maintenance personnel.

Accordingly, the present disclosure describes one or more devices that are configured to receive and suspend an aircraft part using already-existing attachment points on the apparatus (i.e., those that are used to couple the apparatus to an aircraft wing or rudder). The devices described by the present disclosure may allow for the manipulation (e.g., rotation) of the aircraft part by a single person, making maintenance and repair operations on such apparatuses safer and more efficient.

To facilitate a better understanding of the present disclosure, the following examples of certain embodiments are given. In no way should the following examples be read to limit, or define, the scope of the disclosure. Embodiments of the present disclosure and its advantages may be best understood by referring to FIGS. 1-2, where like numbers are used to indicate like and corresponding parts.

Figure 1A:
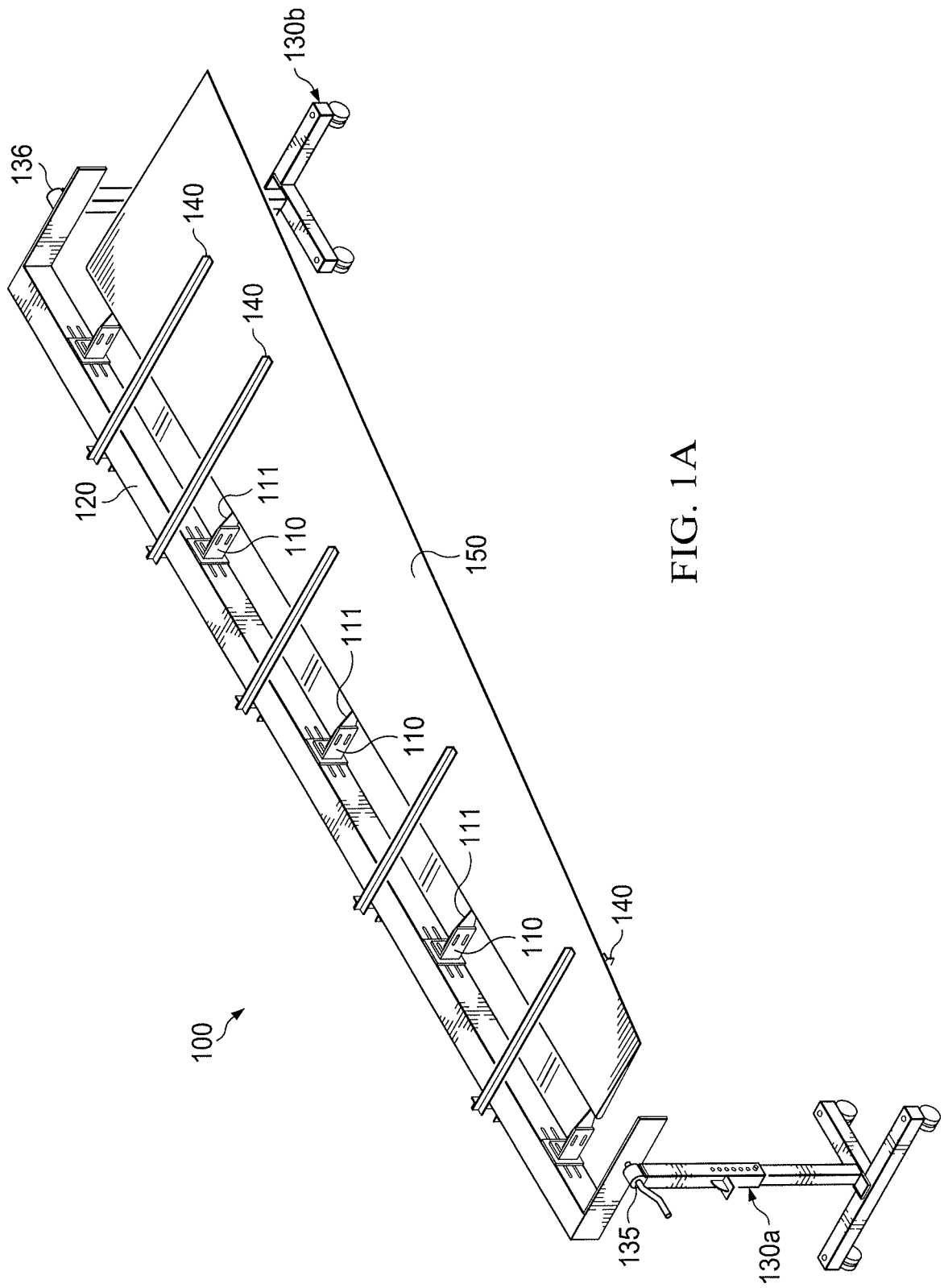
FIG. 1A illustrates a perspective view of an example device for suspending an aircraft flight control apparatus, in accordance with embodiments of the present disclosure.
Figure 1B:
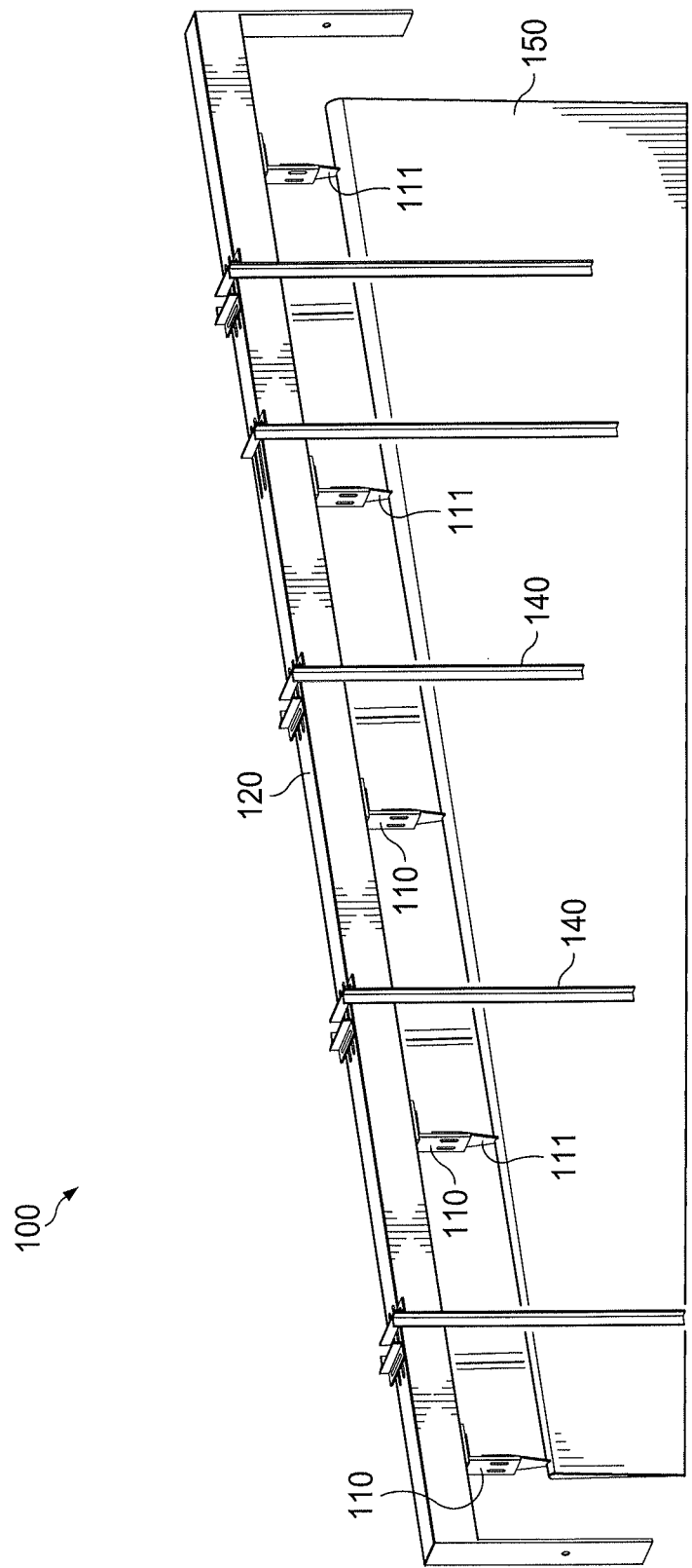
FIG. 1B illustrates another perspective view of the device for suspending an aircraft flight control apparatus of FIG. 1A in accordance with embodiments of the present disclosure.
Figure 1C:
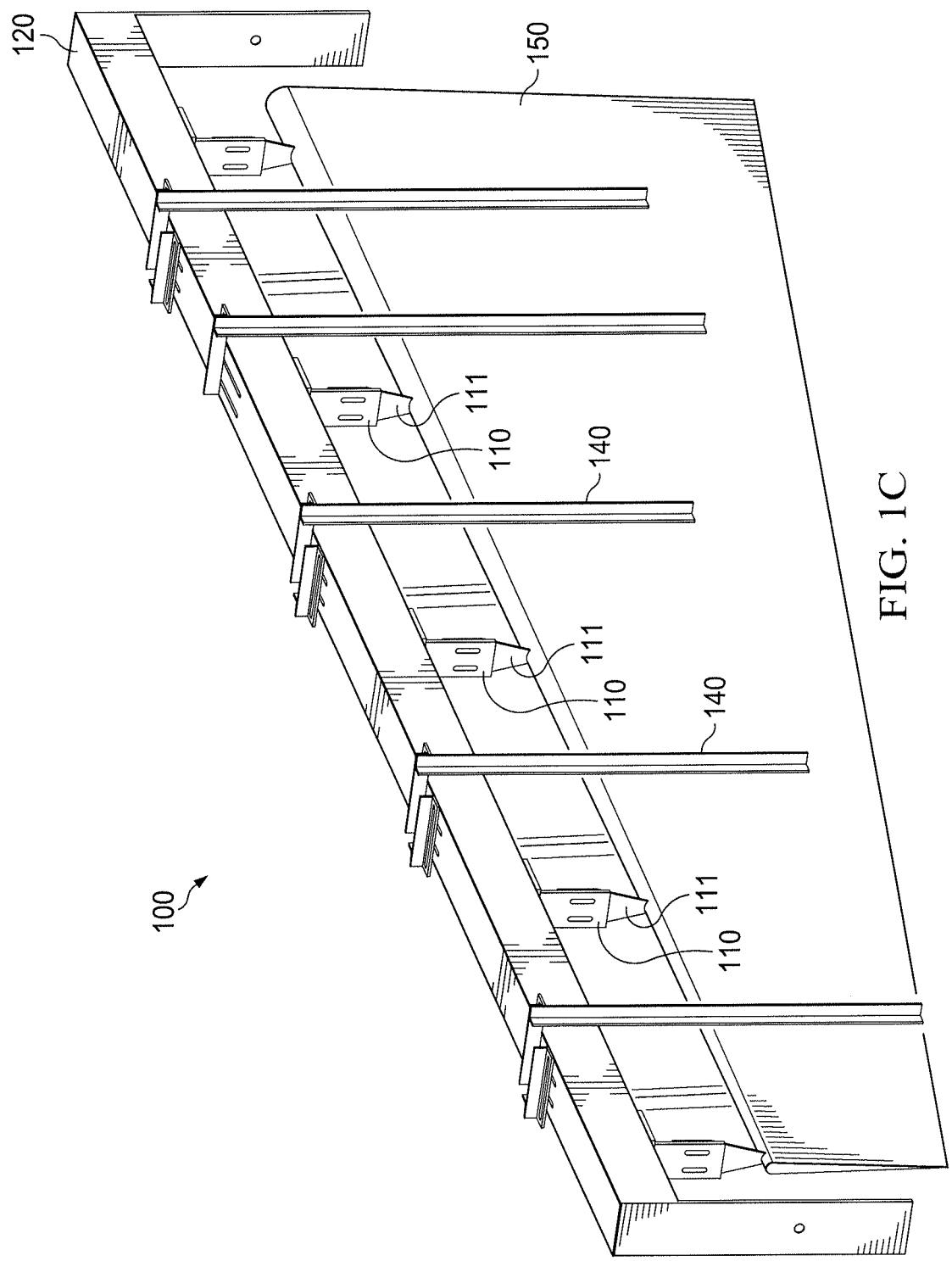
FIG. 1C illustrates another perspective view of the device for suspending an aircraft flight control apparatus of FIG. 1A in accordance with embodiments of the present disclosure.

FIGS. 1A-1C illustrate perspective views of an example device 100 for suspending an aircraft flight control apparatus 150, in accordance with embodiments of the present disclosure. Aircraft flight control apparatus 150 may include any suitable type of aircraft flight control apparatus, such as wings, wing flaps, ailerons, elevators, or rudders. Device 100 may suspend flight control apparatus 150 during maintenance and/or repair operations, and may allow for safer and more efficient conditions for such maintenance and/or repair operations. In particular embodiments, for instance, device 100 may be a rear wing or rudder spar simulator that allows flight control apparatuses from specific aircraft to be attached to and suspended from device 100 for maintenance and/or repair operations by a single operator. Device 100 may be composed of any suitable material, such as steel, aluminum, or an alloy.

Device 100 may include a support 130 at each end (i.e., a first support 130A at a first end of device 100 and a second support 130B at a second end of device 100), a spine 120 coupled to each support 130, clamping arms 140 coupled to the spine 120, and fixtures 110 coupled to the spine. Clamping arms 140 may be configured, as shown, to surround each side of flight control apparatus 150 when apparatus 150 is coupled to spine 120. Fixtures 110 may be configured to receive flight control apparatus 150 using attachment plates 111 and couple apparatus 150 to spine 120 for maintenance and/or repair operations. Although illustrated as fixtures 110 using attachment plates 111 to couple apparatus 150 to spine 120, it will be understood that fixtures 110 may be used without attachment plates 111 to couple apparatus 150 to spine 120. For example, fixtures 110 may resemble attachment plates 111 in certain embodiments, such that attachment plates 111 are not needed in addition to fixtures 110. The size or length of clamping arms 140 may vary on device 100. For example, clamping arms at one end of device 100 may be longer and/or larger and clamping arms at the other end of device 100 may be shorter and/or smaller to conform with the tapered design of particular flight control apparatuses.

Supports 130 may each include a pillar and a base as illustrated. The bases of supports 130 may each include a plurality of legs, each of which includes one or more wheels for moving device 100 into different positions or locations. Supports 130 may be height adjustable, in particular embodiments. Supports 130 may be adjustable using any suitable mechanism. For instance, supports 130 may be mechanically adjustable as shown in FIG. 1A, wherein one or more pins are used on each support 130 to set the height of supports 130 during operation. In other embodiments, supports 130 may be adjustable using hydraulic or electronic means. In some embodiments, the height of supports 130 may be controlled using a remote control apparatus. For instance, maintenance personnel located between supports 130 during operation may use the remote control apparatus to actuate rotation device 135 and rotate spine 120.

In addition, in certain embodiments, fixtures 110 and/or clamping arms 140 may be adjustable. For example, the locations of fixtures 110 and/or clamping arms 140 along spine 120 may be adjustable (i.e., their respective positions may move in the direction of spine 120) to fit various sizes or shapes of flight control apparatuses. In addition, clamping arms 140 may be adjustable with respect to their distance from spine 120. For instance, clamping arms 140 may be adjusted away from spine 120 during loading and unloading of flight control apparatus 150. After flight control apparatus 150 has be loaded and coupled to spine 120 using fixtures 110, clamping arms 140 may be adjusted toward apparatus 150 to secure it during the maintenance or repair operations. This may allow for the safe removal of multiple portions of the skin of apparatus 150. For instance, clamping arms 140 may prevent twisting when multiple skins are removed during maintenance or repair operations. In certain embodiments, clamping arms 140 may include a soft or compliant material (e.g., foam) coupled to the inside of arms 140 (i.e., the side that faces flight control apparatus 150) to avoid damage to flight control apparatus 150.

Fixtures 110 and attachment plates 111 may be configured to couple flight control apparatus 150 to spine 120 using the same attachment points on flight control apparatus 150 that are used to couple flight control apparatus 150 to the spar of an aircraft. For example, in certain embodiments, fixtures 110 and attachment plates 111 may mimic the spar of an aircraft to which flight control apparatus 150 typically attaches. In particular embodiments, fixtures 110 may be generically designed, and may be coupled to aircraft- or flight control-specific attachment plates 111. Attachment plates 111 may therefore be tailored to coupling specific flight control apparatuses to device 100. Fixtures 110 may couple flight control apparatus 150 to spine 120 using any suitable mechanism. For example, in some embodiments, fixtures 100 may use a quick-release pin that is the same diameter of the bolt used to couple flight control apparatus 150 to an aircraft. As another example, fixtures may use a bolt and nut combination that is similar to the bolt and nut combination used to couple flight control apparatus 150 to an aircraft.

Device 100 may also include rotation device 135 coupled to one of supports 130 as illustrated. At least one bearing 136 (e.g., a trunnion bearing) may be included on the other support 130 to allow for rotation of flight control apparatus 150 using rotation device 135 during maintenance or repair operations. That is, rotation device 135 and the associated trunnion bearing may allow device 100 to rotate spine 120 and thus, flight control apparatus 150. Spine 120 may be rotated to any suitable position during such maintenance or repair operations using rotation device 135. For instance, in some embodiments, rotation device 135 may rotate spine 120 to any position within the 360 degree circle. Device 100 may therefore mitigate awkward positions or postures that may be required by maintenance personnel in typical operations, as well as the other problems mentioned above with respect to traditional methods of suspending aircraft flight controls (e.g., between two sawhorse devices). Rotation device 135 may rotate spine 120 using any suitable mechanism. For example, rotation device 135 may utilize mechanical means (e.g., mechanical gears in a gear box) for rotating spine 120. As other examples, rotation device 135 may utilize hydraulic or electric means for rotating spine 120.

Rotation device 135 may be located proximate to the center of gravity of spine 120, fixtures 110, and clamping arms 140. Such a location of rotation device 135 may avoid issues in rotating spine 120 (e.g., uncontrolled rotation due to imbalances). Because the weight of flight control apparatus 150 may be small compared to the combined weight of spine 120, fixtures 110, and clamping arms 140, the addition of flight control apparatus 150 to device 100 may have little effect on the relative balance during rotation. However, in certain embodiments, the location of rotation device 135 may be proximate to the center of gravity for spine 120, fixtures 110, clamping arms 140, and an approximate weight of flight control apparatus 150 (which may be selected as an average of a typical flight control apparatus to be coupled to device 100). This may further avoid rotation issues caused by imbalances. In some embodiments, the relative location of the coupling of rotation device 135 to spine 120 may be adjustable, which may allow for increased usability of device 100 for many more applications (i.e., for use with flight control apparatuses of multiple sizes, shapes, and/or weights).

Using a device that mimics the interface connections found on the actual aircraft wing, more skins can be removed from the wing/rudder being repaired at one time as compared with traditional methods of suspending the flight control apparatus. In addition, by creating or simulating the actual mating locations found on the rear or aft spar of a wing onto the rotating tool (i.e., fixtures 110 or attachment plates ill used with fixtures 110), device 100 may allow the locations of the fixtures 100 to remain concentric to each other while structural repairs are being performed to the flight control apparatus in addition to being able to position the flight control apparatus into an ergonomic position for the maintenance personnel. Moreover, a device according to the present disclosure may allow for a flight control apparatus to be rotated by the maintenance person as needed during operations. In addition to allowing aircraft flight control apparatus to rotate while suspended, one significant value of mating the flight control apparatus to the device using the actual spar connection points is that it keeps the flight control spar connection points concentric during the repair process.

Modifications, omissions, or additions may be made to FIGS. 1A-1C without departing from the scope of the present disclosure. For example, in certain embodiments, device 100 may include one or more hinges in suitable locations (e.g., at the coupling points of spine 120 and supports 130) such that device 100 may be configured to be folded in such a way that its footprint is minimized for storage when not in use. Furthermore, in certain embodiments, device 100 may include one or more towing attachments such that device 100 may be coupled to a vehicle for towing, such as to and from a parked aircraft.

Figure 2:
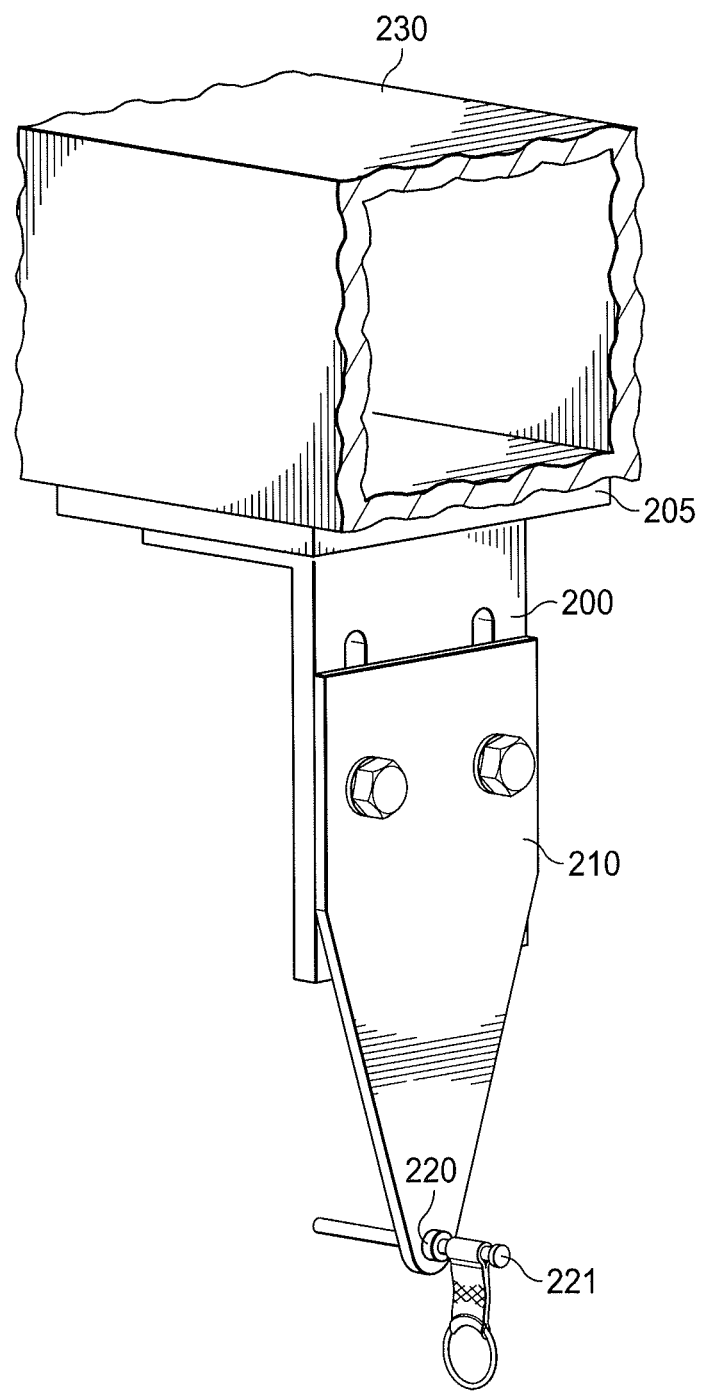
FIG. 2 illustrates an example fixture and attachment plate for coupling an aircraft flight control apparatus to the device of FIG. 1, in accordance with embodiments of the present disclosure.

FIG. 2 illustrates an example fixture 200 and attachment plate 210 for coupling an aircraft flight control apparatus to device 100 of FIG. 1, in accordance with embodiments of the present disclosure. Fixture 200 and attachment plate 210 may be coupled to one another using any suitable mechanism. In certain embodiments, the coupling of attachment plate 210 onto fixture 200 may be adjustable. Fixture 200 may further be coupled to spine 230, which may be similar to spine 120 of FIG. 1. In some embodiments, an intermediate plate 205 may be disposed between fixture 200 and spine 230.

Attachment plate 210 may mimic the rear or aft spar of an aircraft to which the aircraft flight control apparatus attaches. Fixture 200 may be of a generic size and shape, such that different attachment plates 210 of varying sizes and shapes may be coupled thereto (e.g., depending on the particular flight control apparatus being attached to the device). Attachment plate 210 may be configured, using fixture 200, to couple an aircraft flight control apparatus to a spine of a device in accordance with the present disclosure (e.g., to spine 120 of device 100 of FIG. 1). The coupling of the flight control apparatus to attachment plate 210 may be done using hinge point 220. The flight control apparatus may be coupled to attachment plate 210 using quick-release pin 221. For example, in particular embodiments, a mounting hole of the flight control apparatus (i.e., for mounting the apparatus to an aircraft) may be aligned with the hole of hinge point 220. Thereafter, quick-release pin 221 may be inserted into the hole to secure the flight control apparatus to attachment plate 210 and fixture, and thus, to spine 120.

Attachment plate 210 and hinge point 220 may be configured to be adjustable, in particular embodiments. For example, fixture 200 may utilize adjustable components (e.g., attachment plate 210) and/or multiple hinge points that align with the attachment points of the aircraft flight control 150 that are used to couple the aircraft flight control 150 to an aircraft wing. The use of adjustable components allows for device 100 to suspend multiple types of aircraft flight control apparatuses 150, such as those designed for different aircraft or those designed for different mounting points on the same aircraft.

Modifications, omissions, or additions may be made to FIG. 2 without departing from the scope of the present disclosure. For example, the size and/or shape of attachment plate 210 may be different than that illustrated, and may change according to the application in which it is used. In addition, the size and/or shape of fixture 200 may be different than that illustrated. As another example, a bolt and nut combination may be used to couple an aircraft flight control apparatus to attachment plate 210 rather than the quick-release pin illustrated.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A device comprising:
   a first support;
   a second support;
   a spine comprising a single longitudinal structure coupled at a first end of the spine to the first support and coupled at a second end of the spine to the second support;
   a plurality of fixtures coupled to the spine, the plurality of fixtures configured to couple an aircraft flight control apparatus having a first face and a second face to the spine;
   a first plurality of clamping arms coupled to a first side of the spine and configured to extend along the first face of the aircraft flight control apparatus, the first plurality of clamping arms extending away from the spine in a first direction;
   a second plurality of clamping arms coupled to a second side of the spine that is opposite the first side of the spine, the second plurality of clamping arms configured to extend along the second face of the aircraft flight control apparatus, the second plurality of clamping arms extending away from the spine in the same first direction as the first plurality of arms, wherein:
      positions of each of the first and second plurality of clamping arms along the spine are adjustable;
      each of the first and second plurality of clamping arms are adjustable away from and towards the spine; and
      each particular clamping arm of the first and second plurality of clamping arms comprises a material coupled to a side of the particular clamping arm that faces the aircraft flight control apparatus, the material configured to prevent damage to the aircraft flight control apparatus; and
   a plurality of attachment plates, each said attachment plate coupled to a particular fixture of the plurality of fixtures, wherein the plurality of fixtures are configured to couple the aircraft flight control apparatus to the spine using the plurality of attachment plates, wherein at least one of the attachment plates is formed with a first hole that is configured to align with a mounting hole of the flight control apparatus.

2. The device of claim 1, wherein the plurality of fixtures configured to receive the aircraft flight control apparatus are configured to couple the aircraft flight control apparatus to the spine using attachment points on the aircraft flight control apparatus.

3. The device of claim 2, wherein the attachment points are configured to couple the aircraft flight control apparatus to a spar of an aircraft.

4. The device of claim 1, further comprising:
a rotation device coupled to the first support and the spine;
at least one bearing coupled to the second support and the spine;
wherein the rotation device and the bearing are configured to rotate the spine about an axis when the rotation device is actuated.

5. The device of claim 4, wherein the rotation device is disposed proximate to a center of gravity for the spine, the plurality of fixtures, and the first and second plurality of clamping arms.

6. The device of claim 1, wherein a location of at least one of the plurality of fixtures is adjustable.

7. The device of claim 1, wherein a height of the first support and a height of the second support are each adjustable.

8. The device of claim 1, wherein the first support and the second support each comprise a pillar and a base.

9. A device, comprising:
a first support;
a second support;
a spine comprising a single longitudinal structure coupled at a first end of the spine to the first support and coupled at a second end of the spine to the second support;
one or more gears coupled to the first support and the first end of the spine, the one or more gears configured to rotate the spine about an axis when actuated;
at least one bearing coupled to the second support and the second end of the spine, the at least one bearing configured to allow the spine to rotate about the axis when the one or more gears are actuated;
a plurality of fixtures coupled to the spine;
a plurality of attachment plates, each said attachment plate coupled to a fixture of the plurality of fixtures and configured to couple an aircraft flight control apparatus having a first face and a second face to the spine using attachment points of the aircraft flight control apparatus;
a first plurality of clamping arms coupled to a first side of the spine and configured to extend along the first face of the aircraft flight control apparatus, the first plurality of clamping arms extending away from the spine in a first direction; and
a second plurality of clamping arms coupled to a second side of the spine that is opposite the first side of the spine, the second plurality of clamping arms configured to extend along the second face of the aircraft flight control apparatus, the second plurality of clamping arms extending away from the spine in the same first direction as the first plurality of arms, wherein:
positions of each of the first and second plurality of clamping arms along the spine are adjustable;
each of the first and second plurality of clamping arms are adjustable away from and towards the spine;
each particular clamping arm of the first and second plurality of clamping arms comprises a material coupled to a side of the particular clamping arm that faces the aircraft flight control apparatus, the material configured to prevent damage to the aircraft flight control apparatus; and
the plurality of fixtures are configured to couple the aircraft flight control apparatus to the spine using the plurality of attachment plates, wherein at least one of the attachment plates is formed with a first hole that is configured to align with a mounting hole of the flight control apparatus.

10. The device of claim 9, wherein a location of at least one of the plurality of fixtures along the spine is adjustable.

11. The device of claim 9, wherein a height of the first support and a height of the second support are each adjustable.

12. The device of claim 9, wherein a position of at least one of the plurality of attachment plates is adjustable.

13. The device of claim 9, wherein the one or more gears are disposed proximate to a center of gravity for the spine, the plurality of fixtures, and the plurality of clamping arms.

14. The device of claim 9, wherein the first support and the second support each comprise a pillar coupled to a base.

15. The device of claim 1, wherein the plurality of fixtures and the plurality of attachment plates are configured to mimic a spar of an aircraft to which the aircraft flight control apparatus attaches.

* * * * *